Patented Oct. 30, 1951

2,573,673

UNITED STATES PATENT OFFICE 2,573,673

METHOD OF PRODUCING N-MONO SUBSTITUTED IMIDIC COMPOUNDS

John J. Ritter, Yonkers, N. Y.

No Drawing. Application May 27, 1950,
Serial No. 164,635

18 Claims. (Cl. 260—545)

This invention relates to the production of N-mono substituted amidic compounds. I have discovered a new chemical process which is characterized by the reaction of an ethylenic substance, a nitrile, and a highly active cationoid substance, to form products in which nitrogen of the nitrile combines with a carbon atom of the ethylene bond of the ethylenic substance and the cationoid substance becomes attached in part to the other carbon atom of the ethylene bond of the ethylenic substance and in part to the carbon atom of the nitrile or CN group. I have further discovered that the products of this reaction constitute intermediates which can be isolated if desired, and which will further react readily with water, alcohols and other hydroxy compounds, forming various amidic compounds. In the case of water the resultant products are N-mono substituted amides.

The process is applicable to ethylenic compounds of widely varying type and properties, for example to ethylenic hydrocarbons, e. g., aliphatic ethylenic hydrocarbons generally such as occur in cracked petroleum oils, propylenes, butenes, e. g. isobutene, pentenes, e. g. trimethyl ethylene, hexenes, heptenes, octenes, e. g. diisobutene and higher aliphatic ethylenic hydrocarbons e. g., containing up to 18 and more carbon atoms, for example, decenes, hexadecenes, eicosene, triacontylene, etc., alicyclic and alicyclic-substituted ethylenic hydrocarbons, including the class generally known as terpenes such as camphene, bornylene, dipentene, carene, fenchene, pinene and the like, also halogen substituted ethylenic substances as allyl chloride, methallyl chloride and the like, aryl substituted ethylenic hydrocarbons such as styrene, alpha-methyl styrene, alpha - methyl - para - methyl styrene, allyl benzene, methallyl benzene and the like as well as other ethylenic substances such as eugenol and isoeugenol, safrol and isosafrol and the like, unsaturated aliphatic acids and their esters such as oleic acid, acrylic acid, methacrylic acid, crotonic acid, undecylenic acid and the like, unsaturated aldehydes and ketones containing the ethylenic bond such as mesityl oxide, acrolein, citral and the like.

Of the foregoing ethylenic compounds, a particularly preferred class consists of ethylenic hydrocarbons free from aliphatic conjugated unsaturation, having at least three carbon atoms and containing a $>C=C<$ group in which the carbon atoms are non-aromatic carbon atoms, not more than one aryl group but at least one hydrogen or alkyl group being directly attached to said $>C=C<$ group. Numerous examples of such ethylenic hydrocarbons are given above and in the specific examples below. Among the preferred ethylenic hydrocarbons of this type are those which contain a single non-aromatic or ethylenic double bond and especially such aliphatic ethylenic hydrocarbons containing 4–8 carbon atoms, inclusive.

I find that nitriles generally function in this process and I have used successfully hydrocyanic acid and saturated aliphatic nitriles including both short and long-chain nitriles, such as acetonitrile, propionitrile, octane nitrile, decane nitrile, dodecane nitrile, tetradecane nitrile, octadecane nitrile and the like; unsaturated nitriles, such as acrylonitrile and methacrylonitrile; aryl-substituted aliphatic nitriles, such as phenyl acetonitrile, cinnamonitrile, etc.; aromatic nitriles, such as, benzonitrile, the toluonitriles, the naphthonitriles, and the like; hydroxynitriles such as beta hydroxypropionitrile, acetone cyanhydrin, also the other types of nitriles such as cyanamid, dicyandiamide, cyanacetamide, ethyl cyanacetate, nitriles of polybasic acids such as cyanogen, malonodinitrile, succinodinitrile, and the like.

As cationoid substances I have found the following to be satisfactory: phosphoric acid, boron trifluoride, stannic chloride and compounds containing an —HSO₃ group, i. e., sulfuric acid, sulfonic acids, e. g. aromatic sulfonic acids such as benzene sulfonic acid, the toluene sulfonic acids, the naphthalene sulfonic acids; aliphatic sulfonic acids such as methane sulfonic acid, hexane-1 sulfonic acid; aliphatic sulfuricacids, e. g., methyl sulfuric and ethyl sulfuric acids. The preferred cationoid substances are those containing an —HSO₃ group, particularly concentrated (96–100%) sulfuric acid.

As shown hereinafter the cationoid substance enters into the reaction and one molecular proportion of the cationoid substance is required for each molecule of product which is formed. Accordingly at least about one molecular proportion of the cationoid substance is used for each molecular proportion of at least one of the other reactants to obtain the maximum yield of the N-mono substituted amidic compound. Thus, when an excess of either the ethylenic hydrocarbon or the nitrile is used the minimum amount of cationoid substance is based on the reactant which is present in the lesser amount. An excess over the stoichiometric quantity may be used but is usually not desirable largely for economic reasons.

The principle of the new reaction is exhibited by the following general formulae wherein the cationoid substance is taken as sulfuric acid and the primary reaction is followed by hydrolysis, R being any radical or hydrogen:

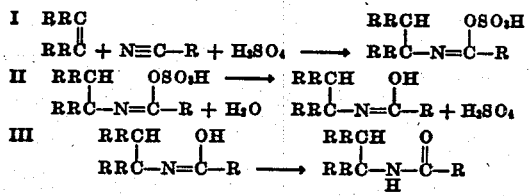

The process is also applicable to unsaturated aliphatic nitriles, or nitriles having an ethylenic group, such as acrylonitrile, methacrylonitrile and the like, in which case the reaction proceeds in substantially the same way but occurs between molecules of such nitrile or nitriles to form polyamides of very large molecular weight as represented by the following formulation, taking acrylonitrile and sulfuric acid for illustration:

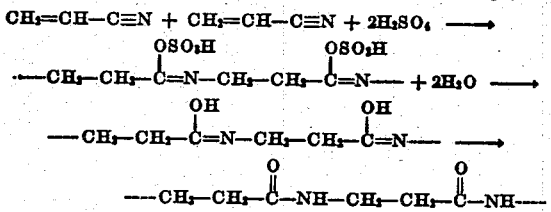

Further, when the ethylenic group in the ethylenic nitrile molecule is separated by two or three carbons from the nitrile group, that is, occupies the gamma or delta position, the same reaction occurs, but in this case intramolecularly, so as to form lactams and according to the following illustrative formulation, in which the cationoid substance is again sulfuric acid and the second step is hydrolysis, R being an organic radical or hydrogen.

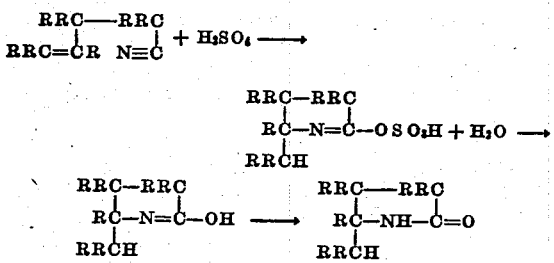

I have found in general that the primary reaction should be carried out in the substantial absence of water or substances capable of producing water under the reaction conditions, i. e. under anhydrous or approximately anhydrous conditions. It has been found to take place spontaneously in a large number of cases with more or less evolution of heat. The time required has been found to vary somewhat according to the particular ethylenic substance or nitrile used although a few hours appear sufficient for substantially complete reaction in most cases. In some cases a very short period—about one-half hour—was sufficient. In general it has not been found necessary to heat the reactants, although heating does not seem to be harmful, and in some cases where less active reactants were employed heating has been found advantageous. External cooling of the reaction mixture was employed where volatile reactants were used or where the nature of the reactants was such that external cooling seemed indicated.

The order in which the reactants are mixed is not important and may be varied to suit the particular case in hand, it having been found advantageous, however, in some cases to mix the cationoid substance and the nitrile first and then add the ethylenic substance to the mixture while in other cases the ethylenic substance and the nitrile were first mixed and this mixture added to the cationoid substance. I have found also that the use of a solvent as acetic acid, dibutyl ether or other solvent, such as an excess of the nitrile, is desirable in some cases, but is not essential as the reaction has been found to proceed satisfactorily in the absence of any solvent or diluent.

In quenching the reaction mixture with water, it may be desirable to neutralize the acid formed with an alkali or an alkaline material such as sodium or potassium hydroxide or carbonate, or ammonia. The neutralization can be carried over to the alkaline side in all cases except those involving the production of products such as formamides which hydrolyze readily, when the desired product is the amide rather than an amine derivable from the amide by hydrolysis. Neutralization is desirable when the amide product is somewhat soluble in water, for example, tertiary butyl formamide, or soluble in dilute acids, or in those instances in which somewhat basic products are formed and remain in solution as salts. In those instances in which the amide is to be distilled from the reaction mixture, it is desirable to neutralize the acid formed during the quenching operation in order to avoid decomposition of the amide by heating in the presence of a strong acid such as sulfuric acid. When the amide is a solid material which is insoluble in water and dilute acids, neutralization of the reaction mixture is usually not necessary.

As an alternative to quenching the reaction mixture with an excess of water and neutralizing the resulting mixture with an alkali, the primary reaction mixture resulting from the reaction of the ethylenic hydrocarbon, the nitrile and the acid, for example, sulfuric acid, may be treated with at least one mol of water for each mol of product and containing dissolved therein at least two mols of sodium acetate for each mol of sulfuric acid. The sulfuric acid formed is thereby converted into sodium sulfate and the acetic acid thus liberated may be removed and recovered by distillation. In this connection, the non-aqueous layer containing the amidic compound may be separated from the remainder of the mixture before distilling off the acetic acid from the mixture.

The ethylenic hydrocarbon and the nitrile are usually used in such proportions that about one nitrile group is present for each ethylenic linkage. However, generally the presence of a substantial excess of either the ethylenic hydrocarbon or the nitrile is not detrimental. When a dinitrile is used, it is obvious that two molecular proportions of an ethylenic hydrocarbon containing a single ethylenic group for each molecular proportion of the nitrile is required for complete reaction with the dinitrile. Also it may be desirable to have present an excess of one reactant or the other, especially the nitrile, to serve as a solvent or diluent. Generally, however, the nitrile and the ethylenic hydrocarbon are used in reacting proportions or substantially such proportions as indicated above.

The usefulness of the invention herein disclosed reaches into many branches of chemical industry. Some of the compounds herein described, for example, N-octyl acetamide and N-isobornyl acetamide are useful substitutes for camphor in the plasticizing of nitrocellulose, cellulose acetate and vinyl resins and as intermediates in the preparation of therapeutic agents. The products obtained by the process of this invention employing cyanamide, dicyandiamide and the like may be used to produce thermoplastic materials by procedures which will be understood by those skilled in this art. High molecular weight aliphatic amides are valuable ingredients in grease compounding, as anti-tack agents in plastic preparations, as detergents and wetting agents, etc. The polyamide products of this invention are thermoplastic and may be molded or drawn into fibers at suitable temperatures.

The following examples will serve to illustrate the novel process of the present invention.

Example I

One mol each of di-isobutene and acetonitrile were dissolved in 200 ml. glacial acetic acid, and the resulting solution added to 500 ml. of glacial acetic acid containing in solution one mol of 98% sulfuric acid. The resulting solution was allowed to stand several hours or overnight at ordinary temperature. The batch was then added to three or four times its volume of water, which precipitated acicular crystals of N-octyl acetamide, $(CH_3)_3C-CH_2-C(CH_3)_2-NHCOCH_3$, of melting point 97–98° C., which is believed to be a new product. The yield was about 85% of theory. Neutralization of the mother liquor, after removal of the above main batch by filtration, precipitated a further quantity of the same product. The combined total yield was 95% of theoretical. The ethylene compound used was commercial di-isobutene which is well known to be a mixture of two isomeric forms, each of which, however, reacts to produce the same product.

Example II

One mol of acetonitrile was added slowly, and with continuous stirring, to 100 g. of 98% sulfuric acid, maintaining the temperature of the mixture around 5° C. by means of external cooling with ice. One mol of commercial di-isobutene was then added, portionwise, with continued stirring at 1–10° C. and dissolved practically completely. The batch was then poured onto about three times its weight of crushed ice, resulting in the separation of an oil. The latter was removed from the mixture, washed, neutralized, and steam distilled to remove a quantity of dimethyl-neopentyl-carbinol which is also formed under these conditions. After removal of the alcohol an oily residue remained in the still. On cooling it solidified to a crystalline product identical with that obtained in Example I, and was removed from the still contents by filtration. The yield in this case was approximately 50% of theory.

Example III

Proceeding as in Example I, with substitution of one mol of benzenesulfonic acid for the one mol of sulfuric acid was used therein, there was obtained 90% of the theoretical yield of N-octyl acetamide, melting point 97–98° C., identical with the product of Example I.

Example IV

One mol each of di-isobutene and acetonitrile were added to a solution of one mol of stannic chloride in 500 ml. of chloroform. The mixture was allowed to stand at ordinary temperature for 48 hours and then added to 500 ml. of water. The mass so obtained was filtered, the chloroform layer separated from the water layer mechanically, and the chloroform removed from the separated chloroform layer by distillation. The residue remaining in the still solidified on cooling and proved to consist of N-octyl acetamide identical with that obtained in Example I.

Example V

One mol of 98% sulfuric acid was dissolved in 500 ml. of glacial acetic acid and one mol of acetonitrile was then added. Gaseous isobutene was then led into the solution with external cooling to maintain the temperature around 30° C., until one mol of the hydrocarbon had been added and the batch was then allowed to stand for three hours. It was then added to about twice its volume of water, in which it dissolved completely. The solution was then neutralized with sodium carbonate and the water-soluble reaction product extracted with ether. Evaporation of the ether extract deposited crystals of N-tertiary-butyl-acetamide, melting point 98° C. The yield was 95% of the theoretical amount.

Example VI

To one mol of 98% sulfuric acid dissolved in 500 ml. of glacial acetic acid was added one mol of trimethylethene and one mol of acetonitrile dissolved in 200 ml. of glacial acetic acid. The reaction mixture was maintained around 30° C. by external cooling during the mixing of the reagents, and then allowed to stand overnight at room temperature. The solution was then added to three or four volumes of water at room temperature, which precipitated crystals of N-tertiary amyl acetamide, melting point 78–79° C. These were removed by filtration. The filtrate was neutralized and steam distilled to isolate a further quantity of the amide, which is steam volatile. The product is somewhat soluble in water but distinctly less so than the product of Example V. Total yield, 65% of the theoretical value.

Example VII

Proceeding as in Example I, with substitution of one mol of cyanacetamide for the acetonitrile used therein, there was produced a new product, viz., N-octyl malonamide, crystals from benzene, melting point 119–121° C. Yield, 65% of the theoretical value.

Example VIII

Proceeding as in Example I, with substitution of one mol of benzyl cyanide for the acetonitrile used therein, there was produced N-octyl-phenyl-acetamide in yield 75% of the theoretical value, also a new product. Crystals, from ligroin, melted at 85–86° C.

Example IX

One mol of ethyl cyanacetate was mixed with one mol of hexane-1 sulfonic acid dissolved in 500 ml. of glacial acetic acid. To the resulting solution was added one mol of di-isobutene. The mixture was allowed to stand overnight at room temperature (25° C.) and then was poured into 2500 ml. of water. The product which separated from the solution was ethyl N-octyl malonamide; melting point from ligroin, 64–65° C. (needles). Yield, 70% of the theoretical value.

Example X

One mol each of acrylonitrile and trimethylethylene were dissolved in 200 ml. of dibutyl ether and the resulting solution was added to 500 ml. of dibutyl ether containing one mol of 98% of sulfuric acid. The resulting solution was allowed to stand for several hours at room temperature, during which time the reaction product settled to the bottom of the reaction vessel as a heavy oil. The supernatant layer of dibutyl ether was then decanted and the oily reaction product was added to 1,000 ml. of water. The amide thus precipitated as a crystalline solid was filtered, dried and re-crystallized from benzene. Yield of N-tertiary-amyl-acrylamide, 75% of the theoretical value. Melting point, 92–93° C.

Example XI

Proceeding as in Example I, with substitution of one mol of trimethylethene for the one mol of di-isobutene used therein, and one mol of cyanacetamide for one mol of acetonitrile used therein, there was produced another new product, N-tertiary-malonamide, in yield of 65% of the theoretical value. Crystals from ligroin, melting point 143–144° C.

Example XII

Proceeding as in Example I, with substitution of one mol of trimethylethane for the one mol of di-isobutene used therein, and one mol of phenylacetonitrile for the one mol of acetonitrile used therein, there was produced N-tertiary-amyl-phenylacetamide, also new, in yield of 70% of the theoretical value. Crystals from benzene, melting point 98° C.

Example XIII

One mol of camphene and one mol of acetonitrile dissolved in 200 ml. of glacial acetic acid were slowly stirred into a solution of one mol of 98% sulfuric acid in 500 ml. of glacial acetic acid in a container externally cooled to prevent a temperature rise above about 30° C. and the resulting solution was then allowed to stand overnight. It was then added to four or five times its volume of cold water. An oil separated, which slowly crystallized; the crystals were filtered off and recrystallized from ligroin. This product, N-isobornyl-acetamide, melts at 144° C. The yield of recrystallized product was about 70% of the theoretical amount. A certain quantity of the isobornyl acetate which is formed simultaneously in the reaction is recoverable as a by-product.

Example XIV

One mol each of di-isobutene and di-cyandiamide were added to a solution of one mol of 98% sulfuric acid in 500 ml. of glacial acetic acid. The mixture was then stirred. The hydrocarbon and the dicyandiamide crystals, which were practically insoluble at first, passed slowly into solution in the acetic acid. The mixture, which evolved heat during this operation and during 20 minutes of stirring while the temperature kept around 30° C. by intermittent external cooling, became a homogeneous reaction mixture and the solution so obtained, was allowed to stand overnight. It was then poured into 5 volumes of water. A viscous oil separated, which, on standing for an additional twenty-four hours, solidified completely. On recrystallization this crystal mass was found to consist of two reaction products. One if these, obtained by recrystallization from ligroin, also from methanol, was N-octyl carbamide, obtained in yield of about 50% of the theoretical value. Melting point, 114–115° C. The second product, N-octyl biuret, melting point 188–190°, was separated from the crude solid reaction product by extraction of the N-octyl carbamide with ether.

Example XV

One mol each of octanenitrile and di-isobutene were added to 500 ml. glacial acetic acid containing 1 mol of 98% sulfuric acid, and the resulting solution allowed to stand overnight. It was then added to about five times its volume of water, which caused the separation of the (new) reaction product, N-octyl caprylamide, as a viscous supernatant oil. This was separated, dried and distilled under reduced pressure. After removal of a small amount of unreacted nitrile as a head fraction, the bulk of the material, N-octyl caprylamide, distilled at 159–161° C. under 2 millimeters of mercury pressure. It is a colorless, viscous oil at ordinary temperature.

Example XVI

Proceeding in the same way, but with substitution of one mol of decanenitrile for the one mol of octanenitrile used therein, there was produced N-octyl capramide, boiling point 171–173° C. at 2 mm. mercury pressure. Yield, 70% of the calculated value. This compound, believed to be new, was a colorless viscous oil which solidified on standing for a time to feathery crystals of waxy appearance.

Example XVII

One mol of decanenitrile was dissolved in 300 ml. of glacial acetic acid containing one mol of 98% sulfuric acid, and a stream of gaseous isobutene was led into the solution. The temperature rose during this operation, and was moderated at intervals by external cooling. After one mol of isobutene had been absorbed, the gas stream was stopped and the reaction mixture allowed to stand for three hours. It was then added to about five volumes of water, which caused the separation of the reaction product, N-tertiary-butyl-capramide, as a supernatant oil which was isolated and distilled under reduced pressure. This compound (new) boils at 156–159° C. under 2 mm. mercury. It was obtained as a colorless, viscous liquid which solidified to a crystalline mass on standing. The yield was 75% of the theoretical amount.

Example XVIII

One mol of tetradecanenitrile was dissolved in 500 ml. of glacial acetic acid containing one mol of 98% sulfuric acid, and gaseous isobutene led into the solution as in Example XVII. The gas was rapidly absorbed wth spontaneous temperature rise to about 50° C. After one mol of isobutene had been absorbed the gas stream was stopped, and the reaction mixture permitted to stand overnight. It was then added to five volumes of cold water. This caused the separation of an oil which solidified practically completely on standing for an additional twenty-four hours. The crystals were separated by filtration, and recrystallized from iso-propyl alcohol-water (70–30). The product, N-tertiary-butyl-myristamide (new) was obtained as shining plates of melting point 57–58° C. The yield was 70% of the theoretical value.

Example XIX

Proceeding as in Example XVIII, with substitution of one mol of octadecanenitrile for the one mol of tetradecanenitrile used therein, there was obtained N - tertiary - butyl - stearamide. The crude product solidified immediately on dilution of the reaction mixture with water, and was purified by recrystallization from methanol. It melted at 73-73.5 C., and consisted of plate-like crystals of pearly luster. The yield of this new product was approximately 85% of the theoretical amount.

Example XX

One mol of acrylonitrile (which is both a nitrile and an ethylenic compound) was dissolved in 100 ml. of glacial acetic acid containing one mol of 98% sulfuric acid, and the resulting solution was allowed to stand at room temperature for one week. It was then added to three volumes of cold water and neutralized with sodium carbonate. An amorphous mass precipitated, which was isolated by filtration as a spongy, elastic rubber-like sheet or skin. Complete drying of this product in an oven at 60° C. produced a tough, horn-like mass, believed to be a new product. The latter, when immersed anew in water, absorbed a small amount of water and returned to its original plastic, elastic form.

Example XXI

One mol each of styrene and acetonitrile were dissolved in 200 ml. of glacial acetic acid and the resulting solution was added to 500 ml. of glacial acetic acid containing in solution one mol of benzene sulfonic acid. The resulting solution was allowed to stand several hours or overnight at room temperature. The batch was then added to three or four times its volume of water. The product, N-(alpha-phenyl ethyl) acetamide, was precipitated as a heavy, viscous oil, from which it was removed by distillation in vacuo after neutralization and drying. The distilled product was re-crystallized from ligroin and melted at 71-72° C. Yield, 40% of the theoretical amount.

Example XXII

Proceeding as in Example XIII, with substitution of one mol of benzonitrile for the nitrile used therein, there was produced N-iso-bornyl benzamide as plate-like crystals (from ligroin) melting at 130° C. The yield was 70% of the theoretical amount.

Example XXIII

One mol of camphene was dissolved in 500 ml. of glacial acetic acid containing one mol of 98% sulfuric acid, and gaseous hydrocyanic acid was led into the mixture while cooling until one mol of it had been absorbed. The resulting solution was then allowed to stand overnight. It was then added to two liters of water. An oil separated, which on exposure to the air for several hours (to permit some of by-product, isobornyl acetate, to evaporate) crystallized practically completely and was N-isobornyl formamide. It was removed from the aqueous liquor by filtration and recrystallized from 10% alcohol-water mixture. It melted at 72-73° C. The yield was 50% of the theoretical amount.

Example XXIV

Proceeding as in Example I, with substitution of one mol of beta-hydroxy propionitrile for the nitrile used therein, there was obtained N-octyl beta-hydroxy-propionamide, boiling at 163-164° C. at 3-4 mm. mercury pressure. The yield of this product (new) was 85% of the theoretical amount.

Example XXV

One mol of cyanamide was added to 500 ml. of glacial acetic acid containing two mols of 98% sulfuric acid, and one mol of trimethylethene was added portionwise, with external cooling to avoid temperature rise above 30° C. The reaction mixture was allowed to stand for three hours, and then added to two liters of water. An oil separated which solidified in a short time to a crystalline mass which was tertiary-amyl-carbamide, melting at 156-158° C. After one recrystallization from methanol, the yield was 60% of the theoretical amount.

Example XXVI

Proceeding as in Example XXI, with substitution of one mol of alpha-methyl styrene for the styrene used therein, there was produced N-(dimethyl-phenyl-carbinyl) acetamide. Crystals from ligroin melted at 97.5-98.5° C.

Example XXVII

One mol of 98% sulfuric acid was added slowly to one mol of acetonitrile with external cooling under tap water. A clear, colorless solution resulted. To this solution was added one mol of allyl benzene. The reaction mixture was agitated and the temperature rose to 50° C. at which point it was maintained by external cooling by means of tap water. After two hours, the reaction mixture was added to a solution of 150 ml. of 10 molar sodium hydroxide in 200 ml. of water. A pale yellow oil separated as an upper layer and was isolated. The oil solidified to a white solid on standing overnight. The solid was broken up, washed with water, air dried and crystallized from petroleum ether. Yield of N-(beta-phenyl-isopropyl) acetamide, (acetyl amphetamine), 40% of the theoretical amount. Melting point, 88-89° C.

Example XXVIII

Proceeding as in Example X, with substitution of one mol of phenyl-acetonitrile for the one mol of acrylonitrile used therein, there was produced N - tertiary - amyl - phenylacetamide, in yield of 70% of the theoretical value. Crystals from benzene; melting point, 98° C.

Example XXIX

One mol each of di-isobutene and stearonitrile were dissolved in 200 ml. of di-n-butyl ether and the resulting solution was poured into 500 ml. of di-n-butyl ether containing one mol of methane sulfonic acid. The resulting solution was allowed to stand for several hours. The batch was then added to four times its volume of water. The ether layer was distilled to strip off the dibutyl ether and the residue was crystallized from benzene. The product was N-tertiary-octyl-stearamide.

Example XXX

Proceeding as in Example XXV, substituting one mol of camphene for the one mol of trimethylethylene used therein and one mol of cinnamonitrile for the one mol of cyanamide used therein, there was recovered N-isobornyl cinnamamide; melting point, 153° C.

Example XXXI

A mixture of two mols of isobutene and one mol of cyanogen was slowly passed into one mol of 98% sulfuric acid with external cooling. The reaction mixture was allowed to stand several hours or overnight and was then added to three or four times its volume of water and the mixture was neutralized with sodium carbonate. The product, di-N-tertiary-butyl-oxamide, precipitated as a colorless solid; yield, 45% of the calculated amount. Recrystallized from 1:1 ethanol-water mixture it melted at 176° C. in agreement with M. Brander, Rec. Trav. Chem. 37, p. 67 (1917).

Example XXXII

Two mols of camphene and one mol of succinonitrile were dissolved in 200 ml. of glacial acetic acid and the resulting solution was added to 500 ml. of glacial acetic acid containing two mols of p-toluene sulfonic acid. The reaction mixture was allowed to stand for several hours or overnight and was then added to four or five times its volume of water. The product recovered from the reaction mixture was di-N-isobornyl-succinamide; melting point, 130° C.

Example XXXIII

Proceeding as in Example XXXII, and substituting two mols of di-isobutene for the two mols of camphene used therein and one mol of malononitrile for the one mol of succinonitrile used therein, there was produced, di-N-tertiary-octyl-malonamide; yield, 60% of the theoretical amount; melting point, 108° C.

Example XXXIV

To a mixture of 25 ml. of glacial acetic acid, 22.5 g. (0.2 mol) of di-isobutene and 11 g. of 90% sodium cyanide (0.2 mol) were added in portions with shaking a cool solution of 50 g. of 98% sulfuric acid (0.5 mol) in 25 ml. of glacial acetic acid, at a rate such as to maintain the temperature at 50–60° C. The reaction mixture was allowed to stand overnight and was then poured into 100 ml. of water. The mixture thus formed was neutralized with 75 g. of sodium hydroxide in 250 ml. of water. The reaction product N-tertiary-octyl-formamide, separated as a supernatant oil which was separated, dried and distilled. Boiling point, 110° C./2 ml. Yield, 70% of theory.

Example XXXV

Proceeding as in Example XXV with the substitution of 1 mol of styrene for the trimethylethene used therein, there was produced N-(alpha-phenyl ethyl) carbamide.

Example XXXVI

Proceeding as in Example XIII with the substitution of 1 mol of benzyl cyanide for the acetonitrile used therein and 1 mol of styrene for the camphene used therein, there was produced N-(alpha-phenyl ethyl) benzamide.

Example XXXVII

Proceeding as in Example XXIII with the substitution of 1 mol of styrene for 1 mol of the camphene used therein, there was produced N-(alpha-phenyl ethyl) formamide.

This application is a continuation-in-part of my copending application Serial No. 574,977, filed January 27, 1945, now abandoned, entitled "Method of Producing N-Mono Substituted Amidic Compounds."

What is claimed is:

1. In a process for producing an N-mono hydrocarbon substituted imino compound, the step which comprises reacting one molecular equivalent of a nitrile based on the number of nitrile groups therein with one molecular proportion of a cationoid compound from the group consisting of sulfuric acid, hydrocarbon sulfonic acids and alkyl sulfuric acids and one molecular equivalent based on the number of ethylenic double bonds therein of an unsaturated hydrocarbon from the group consisting of non-conjugated alkenes having at least three carbon atoms, cyclic terpenes and mono-aryl substituted non-conjugated alkenes, under substantially anhydrous conditions.

2. In a process for producing an N-mono hydrocarbon substituted imino compound, the step which comprises reacting in an organic solvent one molecular equivalent of a nitrile based on the number of nitrile groups therein with one molecular proportion of a cationoid compound from the group consisting of sulfuric acid, hydrocarbon sulfonic acids and alkyl sulfuric acids and one molecular equivalent based on the number of ethylenic double bonds therein of an unsaturated hydrocarbon from the group consisting of non-conjugated alkenes having at least three carbon atoms, cyclic terpenes and mono-aryl substituted non-conjugated alkenes, under substantially anhydrous conditions.

3. In a process for producing an N-mono hydrocarbon substituted imino compound, the step which comprises reacting in glacial acetic acid one molecular equivalent of a nitrile based on the number of nitrile groups therein with one molecular proportion of a cationoid compound from the group consisting of sulfuric acid, hydrocarbon sulfonic acids and alkyl sulfuric acids and one molecular equivalent based on the number of ethylenic double bonds therein of an unsaturated hydrocarbon from the group consisting of non-conjugated alkenes having at least three carbon atoms, cyclic terpenes and mono-aryl substituted non-conjugated alkenes, under substantially anhydrous conditions.

4. In a process for producing an N-mono hydrocarbon substituted imino compound, the step which comprises reacting one molecular equivalent of a nitrile based on the number of nitrile groups therein with one molecular proportion of sulfuric acid and one molecular equivalent based on the number of ethylenic double bonds therein of an unsaturated hydrocarbon from the group consisting of non-conjugated alkenes having at least three carbon atoms, cyclic terpenes and mono-aryl substituted non-conjugated alkenes, under substantially anhydrous conditions.

5. In a process for producing an N-mono hydrocarbon substituted imino compound, the step which comprises reacting one molecular proportion of a mono nitrile with one molecular proportion of sulfuric acid and one molecular proportion of a mono alkene containing at least three carbon atoms, under substantially anhydrous conditions.

6. In a process for producing an N-mono hydrocarbon substituted imino compound, the step which comprises reacting one molecular proportion of a mono nitrile with one molecular proportion of sulfuric acid and one molecular proportion of a mono alkene containing four to eight carbon atoms, under substantially anhydrous conditions.

7. In a process for producing an N-mono hydrocarbon substituted imino compound, the step which comprises reacting one molecular proportion of a mono nitrile with one molecular proportion of sulfuric acid and one molecular proportion of a butene, under substantially anhydrous conditions.

8. In a process for producing an N-mono hydrocarbon substituted imino compound, the step which comprises reacting one molecular proportion of acetonitrile with one molecular proportion of sulfuric acid and one molecular proportion of isobutene, under substantially anhydrous conditions.

9. In a process for producing an N-mono hydrocarbon substituted imino compound, the step which comprises reacting one molecular proportion of acetonitrile with one molecular proportion of sulfuric acid and one molecular proportion of di-isobutene, under substantially anhydrous conditions.

10. In a process for producing an N-mono hydrocarbon substituted imino compound, the step which comprises reacting one molecular proportion of a mono nitrile with one molecular proportion of sulfuric acid and one molecular proportion of a mono aryl substituted mono alkene, under substantially anhydrous conditions.

11. In a process for producing an N-mono hydrocarbon substituted imino compound, the step which comprises reacting one molecular proportion of a mono nitrile with one molecular proportion of sulfuric acid and one molecular proportion of styrene, under substantially anhydrous conditions.

12. In a process for producing an N-mono hydrocarbon substituted imino compound, the step which comprises reacting one molecular proportion of acetonitrile with one molecular proportion of sulfuric acid and one molecular proportion of styrene, under substantially anhydrous conditions.

13. In a process for producing an N-mono hydrocarbon substituted imino compound, the step which comprises reacting one molecular proportion of hydrogen cyanide with one molecular proportion of sulfuric acid and one molecular equivalent based on the number of ethylenic double bonds therein of an unsaturated hydrocarbon from the group consisting of non-conjugated alkenes having at least three carbon atoms, cyclic terpenes and mono-aryl substituted non-conjugated alkenes, under substantially anhydrous conditions.

14. In a process for producing an N-mono hydrocarbon substituted imino compound, the step which comprises reacting one molecular proportion of hydrogen cyanide with one molecular proportion of sulfuric acid and one molecular proportion of a mono aryl substituted mono alkene, under substantially anhydrous conditions.

15. In a process for producing an N-mono hydrocarbon substituted imino compound, the step which comprises reacting one molecular proportion of hydrogen cyanide with one molecular proportion of sulfuric acid and one molecular proportion of styrene, under substantially anhydrous conditions.

16. In a process for producing an N-mono hydrocarbon substituted imino compound, the step which comprises reacting one molecular proportion of hydrogen cyanide with one molecular proportion of sulfuric acid and one molecular proportion of a mono alkene having at least three carbon atoms, under substantially anhydrous conditions.

17. In a process for producing an N-mono hydrocarbon substituted imino compound, the step which comprises reacting one molecular proportion of hydrogen cyanide with one molecular proportion of sulfuric acid and one molecular proportion of a mono alkene having four to eight carbon atoms, under substantially anhydrous conditions.

18. In a process for producing an N-mono hydrocarbon substituted imino compound, the step which comprises reacting one molecular proportion of hydrogen cyanide with one molecular proportion of sulfuric acid and one molecular proportion of diisobutene, under substantially anhydrous conditions.

JOHN J. RITTER.

REFERENCES CITED

The following references are of record in the file of this patent:

UNITED STATES PATENTS

| Number | Name | Date |
|---|---|---|
| 2,102,179 | Hopff et al. | Dec. 14, 1937 |
| 2,217,632 | Wolfe | Oct. 8, 1940 |
| 2,244,645 | Jacobson | June 3, 1941 |
| 2,262,002 | Hopff et al. | Nov. 11, 1941 |
| 2,264,354 | Alder et al. | Dec. 2, 1941 |
| 2,310,961 | Kropa | Feb. 16, 1943 |
| 2,332,899 | D'Alelio | Oct. 26, 1943 |
| 2,342,590 | Lichty | Feb. 22, 1944 |
| 2,457,660 | Gresham et al. | Dec. 28, 1948 |

OTHER REFERENCES

Degering: "An Outline of Organic Nitrogen Compounds" (1945), p. 401.